(12) United States Patent
Chiu et al.

(10) Patent No.: US 11,798,735 B2
(45) Date of Patent: Oct. 24, 2023

(54) WIRELESS CHARGER

(71) Applicant: CYNTEC CO., LTD., Hsinchu (TW)

(72) Inventors: Kuan Yu Chiu, Miaoli County (TW); Ching Hsiang Yu, New Taipei (TW); Min-Feng Chung, Taichung (TW)

(73) Assignee: CYNTEC CO., LTD., Hsinchu (TW)

( * ) Notice: Subject to any disclaimer, the term of this patent is extended or adjusted under 35 U.S.C. 154(b) by 158 days.

(21) Appl. No.: 17/148,537

(22) Filed: Jan. 13, 2021

(65) Prior Publication Data

US 2021/0217556 A1     Jul. 15, 2021

Related U.S. Application Data (60) Provisional application No. 63/088,431, filed on Oct. 6, 2020, provisional application No. 62/960,700, filed on Jan. 14, 2020.

(51) Int. Cl.
| | |
|---|---|
| *H01F 27/28* | (2006.01) |
| *H01F 38/14* | (2006.01) |
| *H02J 7/02* | (2016.01) |
| *H02J 50/10* | (2016.01) |
| *H02J 50/40* | (2016.01) |
| *H01F 27/32* | (2006.01) |
| *H02J 7/00* | (2006.01) |
| *H01F 27/34* | (2006.01) |
| *H04M 1/02* | (2006.01) |

(52) U.S. Cl.
CPC ........... *H01F 38/14* (2013.01); *H01F 27/288* (2013.01); *H01F 27/327* (2013.01); *H01F 27/346* (2013.01); *H02J 7/0013* (2013.01); *H02J 7/0042* (2013.01); *H02J 7/02* (2013.01); *H02J 50/10* (2016.02); *H02J 50/402* (2020.01); *H04M 1/0202* (2013.01)

(58) Field of Classification Search
CPC ....................................................... H02J 5/005
USPC ....................................................... 320/108
See application file for complete search history.

(56) References Cited

U.S. PATENT DOCUMENTS

| | | | |
|---|---|---|---|
| 2019/0198234 A1* | 6/2019 | Jung | H01F 27/292 |
| 2019/0215984 A1* | 7/2019 | Pinkos | H01F 38/14 |
| 2020/0044482 A1* | 2/2020 | Partovi | H02J 7/025 |
| 2020/0052516 A1* | 2/2020 | Colosimo | H02J 7/0048 |

* cited by examiner

*Primary Examiner* — Edward Tso
*Assistant Examiner* — Ahmed H Omar
(74) *Attorney, Agent, or Firm* — Min-Lee Teng (57) ABSTRACT

A structure of coils for a wireless charger comprises a plurality of coils, wherein the plurality of coils are stacked into a plurality of layers of coils with each layer comprising at least two coils, wherein at least two electronic devices are capable of being placed over the plurality of coils for charging the at least two electronic devices.

14 Claims, 11 Drawing Sheets

WIRELESS CHARGER

CROSS-REFERENCE TO RELATED APPLICATIONS

This application claims the benefit of U.S. Provisional Application Ser. No. 62/960,700 filed on Jan. 14, 2020 and U.S. Provisional Application Ser. No. 63/088,431 filed on Oct. 6, 2020, the entirety of each Provisional application is incorporated by reference herein.

BACKGROUND OF THE INVENTION

Field of the Invention

The invention relates to a structure of coils, and in particular, to a structure of coils for charging an electronic device.

Description of the Related Art

As charging for consumer and automotive devices become more and more popular, however, the there are some restrictions in placing an electronic device over the coils of a wireless charger for charging the electronic device. In addition, as speed becomes more and more important, the heat dissipation of the wireless charger also becomes an issue.

Accordingly, the present invention proposes a better solution to overcome the above-mentioned problems.

SUMMARY OF THE INVENTION

One objective of the present invention is to provide a structure of coils for a wireless charger to allow at least two electronic devices can be wireless charged at the same time.

One objective of the present invention is to provide a structure of coils for a wireless charger to allow an electronic device to be placed in different orientations for charging.

One objective of the present invention is to provide a wireless charger with a metallic housing unit for better sustaining the stress so as to protect the coils of the wireless charger as well as reducing the size of the wireless charger.

One objective of the present invention is to provide a wireless charger with a metallic housing unit and a fan to create airflows in multiple directions for better heat dissipation of the wireless charger.

In one embodiment, an structure of coils for a wireless charger is disclosed, wherein said structure of coils comprises a plurality of coils, wherein the plurality of coils are stacked into a plurality of layers of coils, wherein at least two electronic devices are capable of being placed over the plurality of coils for charging the at least two electronic devices.

In one embodiment, said two electronic devices are placed over the plurality of coils in a horizontal direction for charging the at least two electronic devices.

In one embodiment, said two electronic devices are placed over the plurality of coils in a vertical direction for charging the at least two electronic devices.

In one embodiment, the plurality of coils are stacked into three layers for forming an active zone of fluxes for charging the at least two electronic devices.

In one embodiment, the plurality of coils are stacked into three layers with each layer comprising at least two coils for forming the active zone of fluxes.

In one embodiment, the plurality of coils are capable of being divided into multiple groups for charging.

In one embodiment, the plurality of coils comprises eighteen coils stacked into three layers, wherein a bottom layer comprises seven coils, a middle layer comprises four coils, and a top layer comprises seven coils.

In one embodiment, the plurality of coils care stacked into two layers, wherein a bottom layer comprises four coils and a top layer comprises five coils.

In one embodiment, each of the two electronic devices is a mobile phone.

In one embodiment, a structure of coils for a wireless charger is disclosed, wherein said structure of coils comprises a plurality of coils, wherein the plurality of coils are stacked into a plurality of layers of coils, wherein an electronic device is capable of being placed over the plurality of coils in at least three different orientations for charging the electronic device.

In one embodiment, an electronic device is disclosed, wherein the electronic device comprises: a metallic housing unit, comprising a metallic plate, a first recess formed on a top side of the metallic housing unit and a second recess formed on a bottom side of the metallic housing unit, wherein the first recess and the second recess are on two opposite sides of the metallic plate; at least one conductive element, disposed in the first recess; and a circuit board, wherein the circuit board is disposed in the second recess and electrically conned to the plurality of at least one conductive element.

In one embodiment, the electronic device is a wireless charger, wherein the at least one conductive element comprises a plurality of coils, wherein the plurality of coils are stacked into a plurality of layers for charging at least one electronic device, and the plurality of coils are disposed in the first recess.

In one embodiment, the circuit board has a through-opening, wherein at least one part of a fan is disposed in the through-opening.

In one embodiment, an EMI (Electromagnetic Interference) filter is disposed over the plurality of coils.

In one embodiment, a plastic cover is disposed over the EMI filter.

In one embodiment, a metal cover is disposed over the circuit board, wherein the plastic cover and the metal cover are at two opposite sides of the metallic plate.

In one embodiment, the metallic housing unit comprising aluminum or aluminum alloy material. In one embodiment, the metallic plate comprises ADC12, that is, the metallic plate can have a strong mechanical strength to withstand the stress when the wireless charger 101 is under pressure, wherein the ADC12 comprises Al—Si—Cu alloy.

In one embodiment, the fan is located at a corner of the metallic housing unit, wherein the fan causes the airflow from a first side of the metallic housing unit into a second side of the metallic housing unit, wherein said first side and said second side are two adjacent sides of the metallic housing unit.

In one embodiment, the fan causes the airflow from a first opening and a second opening of the first side of the metallic housing unit into the second side of the metallic housing unit, wherein said first opening and said second opening of the first side are at two opposite sides of the metallic plate.

BRIEF DESCRIPTION OF THE DRAWINGS

The present invention can be more fully understood by reading the subsequent description and examples with references made to the accompanying drawings, wherein.

DETAILED DESCRIPTION OF THE INVENTION

It is understood that the following disclosure provides many different embodiments, or examples, for implementing different features of the invention. Specific examples of devices and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features are formed between the first and second features such that the first and second features are not in direct contact. In addition, the present disclosure may repeat reference numerals and/or letters in the various examples. This repetition is for the purpose of simplicity and clarity and does not in itself dictate a relationship between the various embodiments and/or configurations discussed.

The present invention discloses a wireless charger with multiple coils stacked into layers for charging electronic devices, wherein the layers of coils forms an active zone of fluxes for charging electronic devices.

The placement of electronic devices over the multiple coils need not to be fixed in a special direction or a special alignment for convenience of users.

Figure 1A:
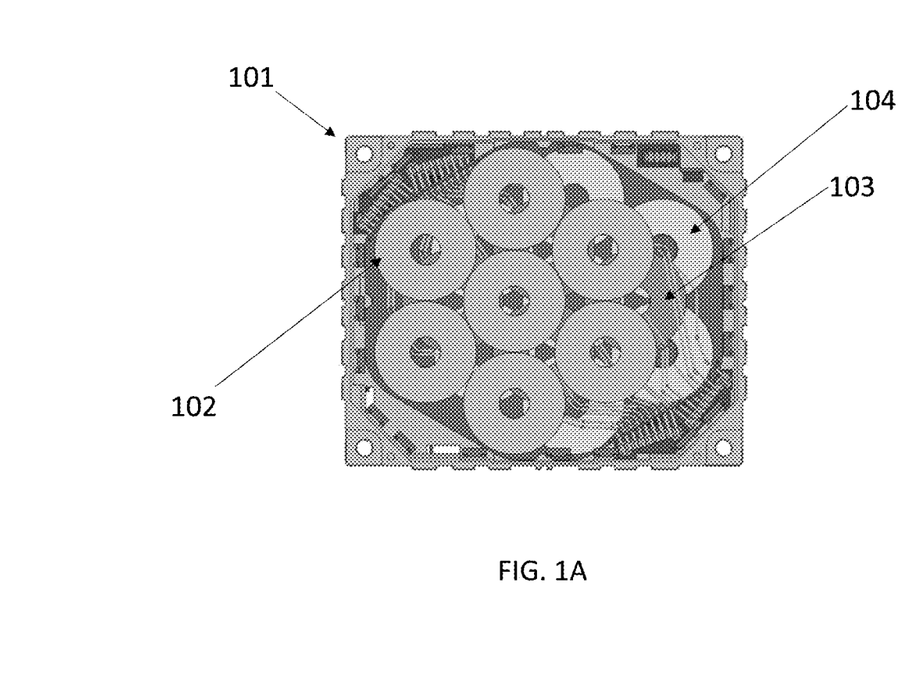
FIG. 1A is a top view of an structure of coils for a wireless charger in accordance with one embodiment of the invention.

FIG. 1A is a top view of an structure of coils for a wireless charger 101 in accordance with one embodiment of the invention, wherein the structure of coils comprises a plurality of coils, wherein the plurality of coils are stacked into a plurality of layers 102, 103, 104 with each layer comprising at least two coils. Please refer to FIG. 1C, FIG. 1D, FIG. 1E and FIG. 1F, wherein at least two electronic devices 200, 201 are capable of being placed over the plurality of layers 102, 103, 104 of coils for charging the at least two electronic devices 200, 201.

Figure 1B:
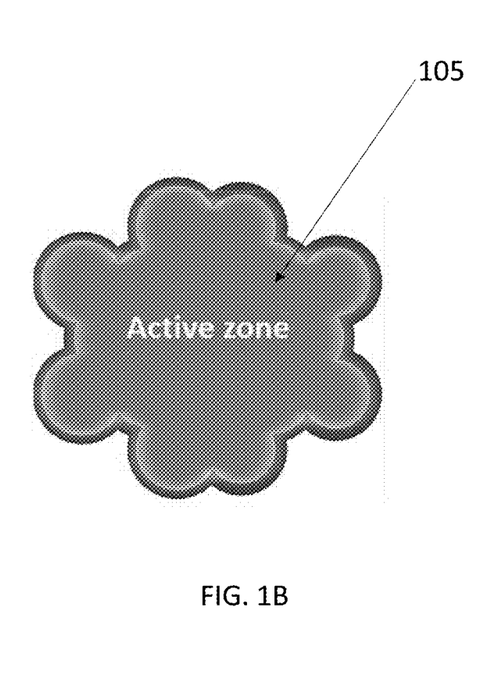
FIG. 1B is a top view of an active zone generated by the charging coils in accordance with one embodiment of the invention.

As shown in FIG. 1B, the plurality of layers 102, 103, 104 of coils forms an active zone 105 of fluxes for charging electronic devices. Please refer to FIG. 1C, FIG. 1D, FIG. 1E and FIG. 1F, the receiving coils 200a, 201a of the electronic devices 200, 201 can be placed in the active zone 105 for charging through coupling induction between the transmitting coils of the plurality of layers 102, 103, 104 and the receiving coils 200a, 201a of the electronic devices 200, 201 without restrictions on the placement orientation of the electronic device 200, 201.

Figure 1C:
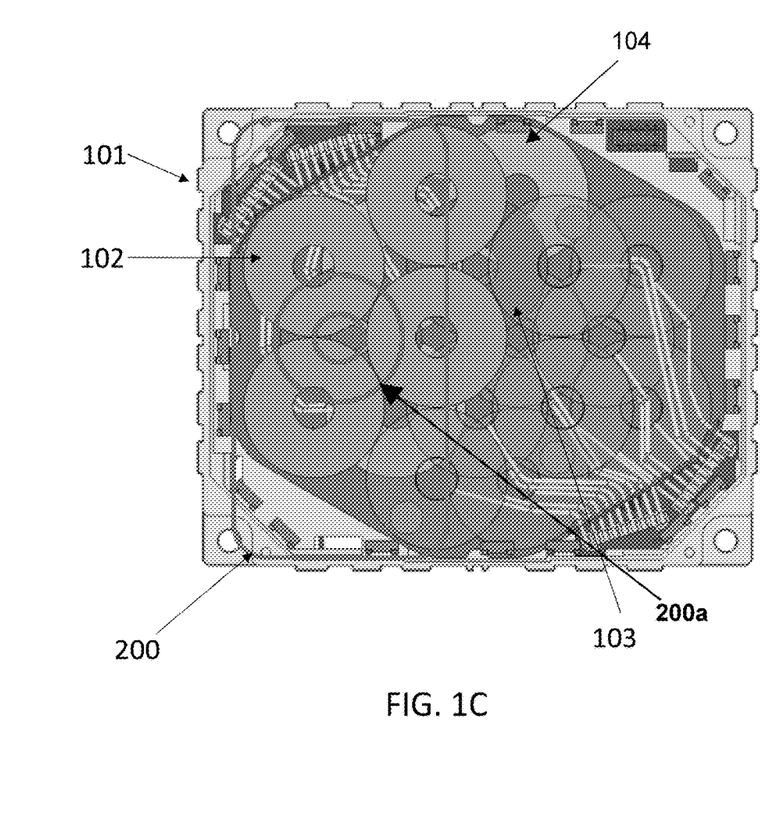
FIG. 1C shows a placement of an electronic device over the charging coils in accordance with one embodiment of the invention.
Figure 1D:
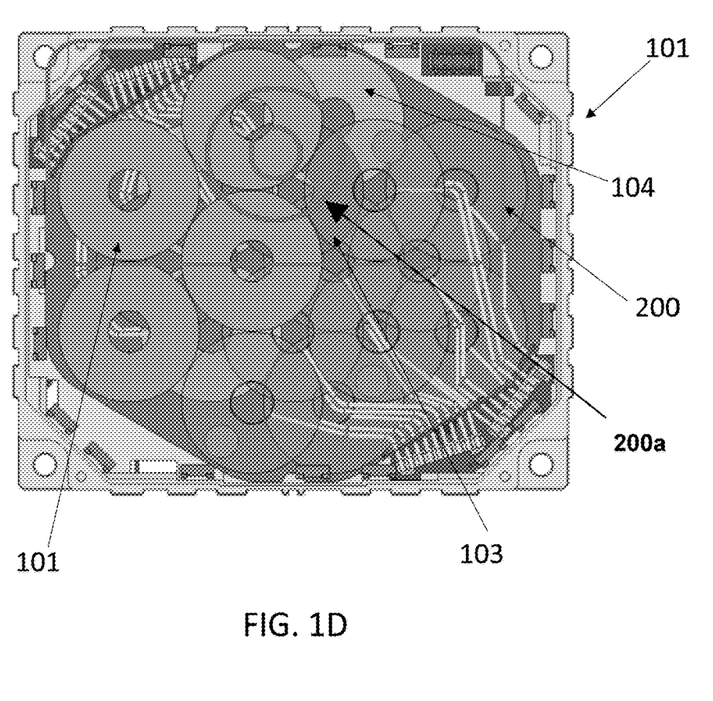
FIG. 1D shows a placement of an electronic device over the charging coils in accordance with one embodiment of the invention.
Figure 1E:
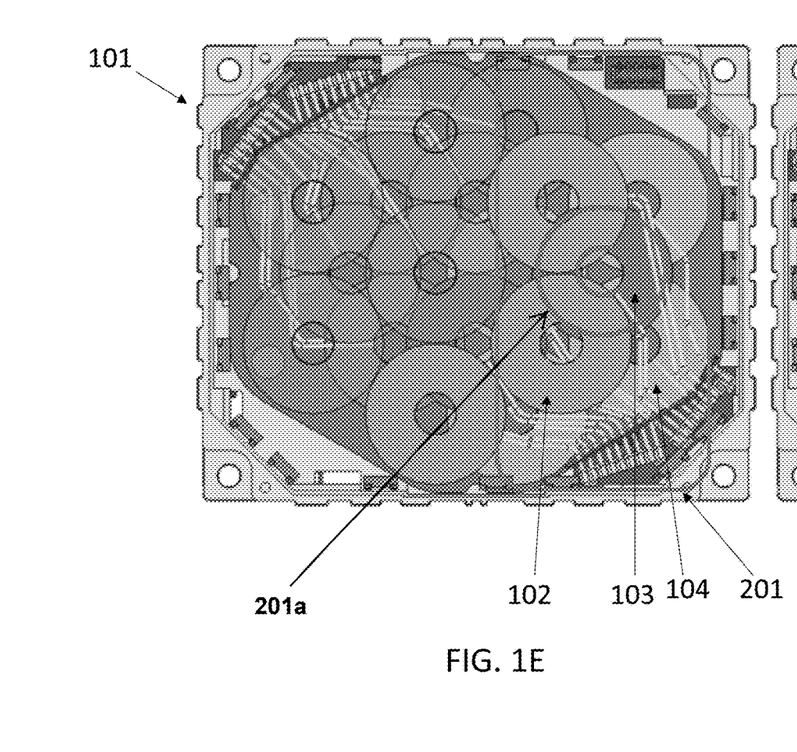
FIG. 1E shows a placement of an electronic device over the charging coils in accordance with one embodiment of the invention.
Figure 1F:
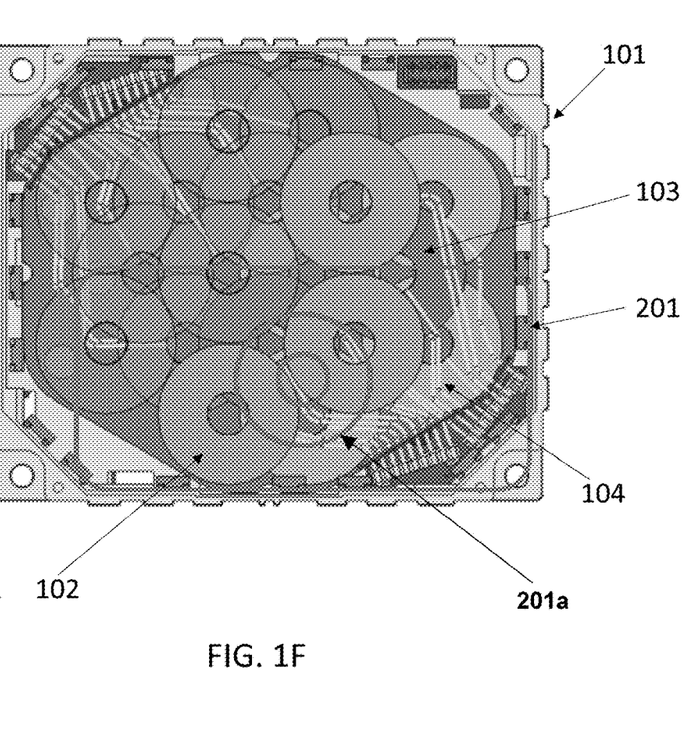
FIG. 1F shows a placement of an electronic device over the charging coils in accordance with one embodiment of the invention.

In one embodiment, please refer to FIG. 1C, FIG. 1D, FIG. 1E and FIG. 1F, two electronic devices 200, 201 are capable of being placed over the plurality of layers 102, 103, 104 of coils in at least two different orientations for charging the at least two electronic devices. For example, the electronic device 200 can be placed in a vertical direction as shown in FIG. 1C or a horizontal direction as shown in FIG. 1D; and the electronic device 201 can be placed in a vertical direction as shown in FIG. 1E, or a horizontal direction as shown in FIG. 1F.

In one embodiment, an electronic device is capable of being placed over the coils in at least three different orientations for charging the at least two electronic devices.

In one embodiment, an electronic device is capable of being placed over the coils in a horizontal, a vertical or a diagonal direction for charging the at least two electronic devices.

Figure 1G:
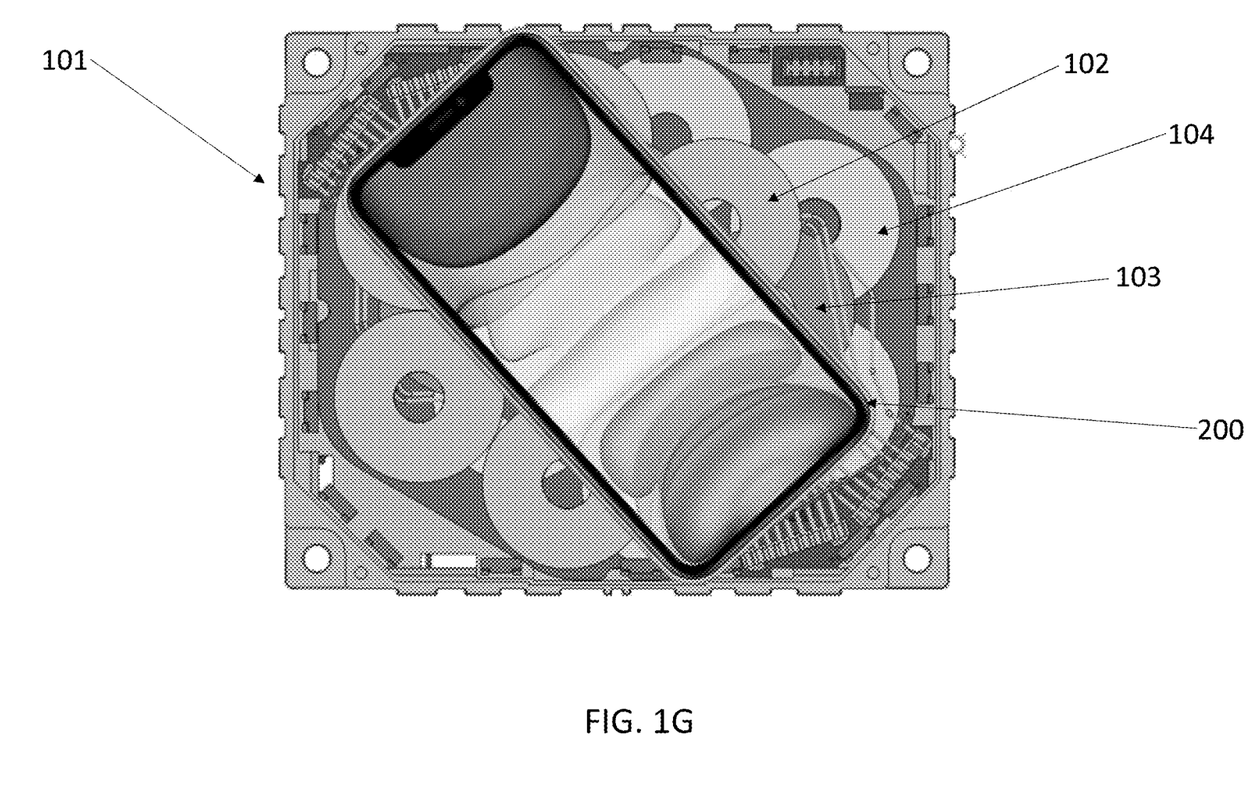
FIG. 1G shows a placement of an electronic device over the charging coils in accordance with one embodiment of the invention.

As shown in FIG. 1G, the electronic device can be placed in a diagonal direction.

In one embodiment, the electronic device is a mobile phone.

In one embodiment, the plurality of coils are stacked into three layers with each layer comprising at least four coils.

In one embodiment, the plurality of coils are capable of being divided into two groups with each group comprising multiple coils.

In one embodiment, the plurality of coils are capable of being divided into two groups with each group comprising nine coils.

In one embodiment, the plurality of coils comprises eighteen coils stacked into three layers, wherein a bottom layer comprises seven coils, a middle layer comprises four coils, and a top layer comprises seven coils.

In one embodiment, each of the electronic devices 200, 201 is a mobile phone.

Figure 1H:
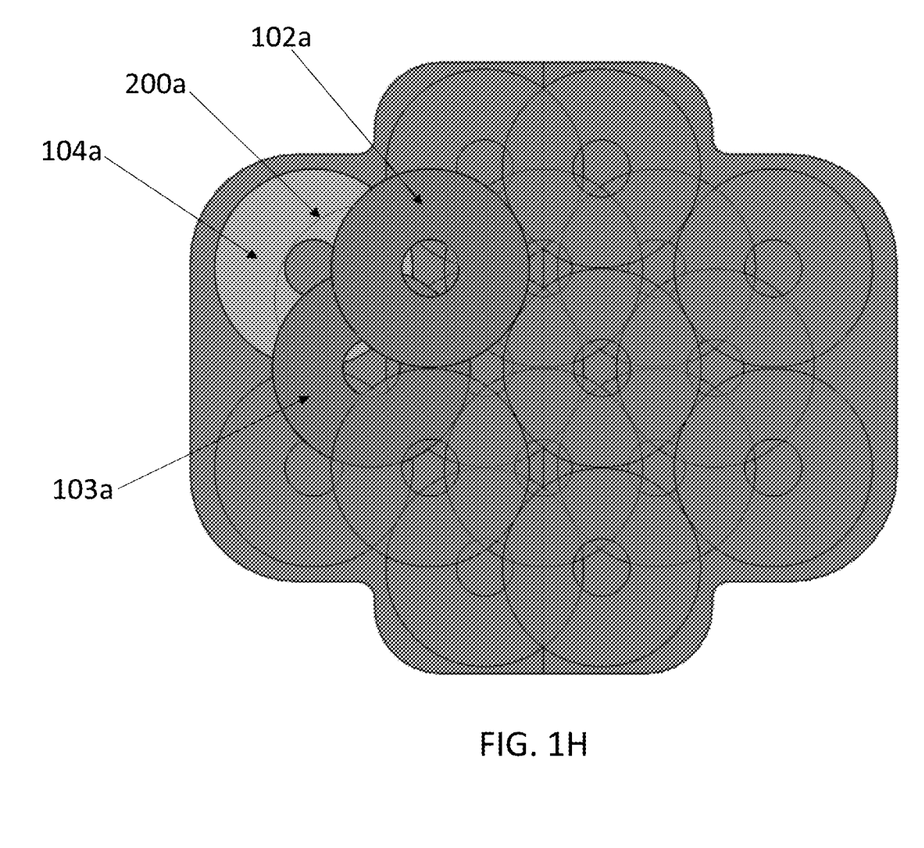
FIG. 1H shows a placement of a receiving coil of an electronic device over the charging coils in accordance with one embodiment of the invention.

In one embodiment, as shown in FIG. 1H, when the receiving coil 200a of the electronic device 200 is located between three coils 102a, 103a, 104a of the plurality of layers 102, 103, 104 of coils, a coil of the three coils 102a, 103a, 104a will be selected for charging the electronic device 200 after determining the selected transmitting coil has a higher K coupling with the receiving coil 200a of the electronic device 200. In one embodiment, the top coil 102a of the three coils 102a, 103a, 104a will be selected, because the distance between the top coil 102a and the receiving coil 200a of the electronic device 200 is the shortest and hence has a better coupling coefficient.

In one embodiment, the wireless charger 101 comprises at least one processor or micro-controller to select the transmitting coil that has a higher K coupling with the receiving coil 200a of the electronic device 200.

Figure 2A:
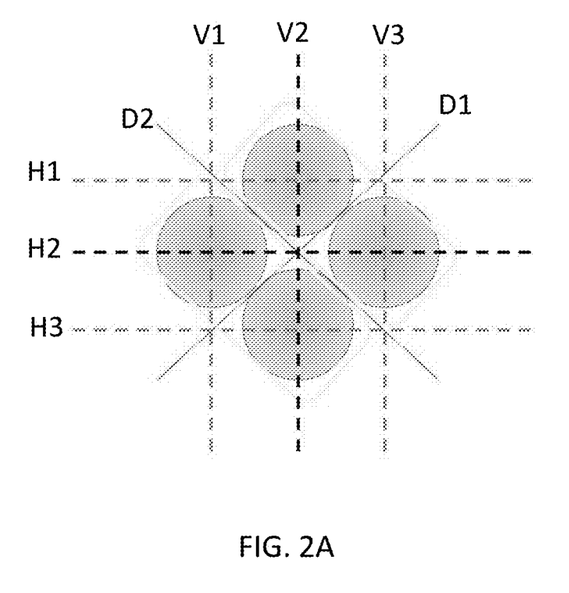
FIG. 2A shows a bottom layer with four coils in accordance with one embodiment of the invention.
Figure 2B:
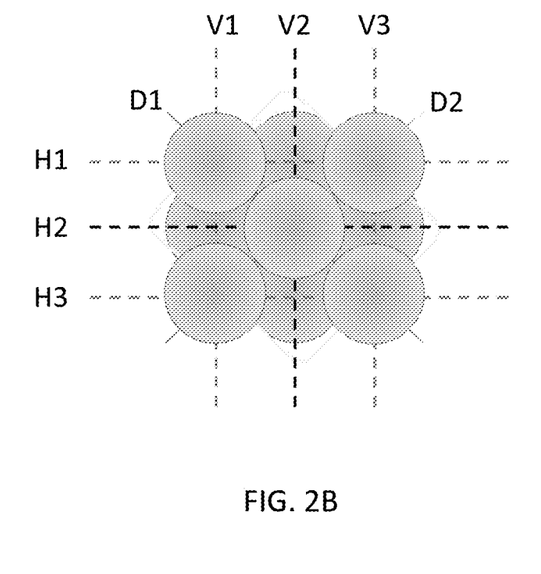
FIG. 2B shows an upper layer with five coils in accordance with one embodiment of the invention.

In one embodiment, as shown in FIG. 2A and FIG. 2B, the plurality of coils comprises are stacked into two layers, wherein a bottom layer comprises four coils and a top layer comprises five coils.

In one embodiment, as shown in FIG. 2A, the four coils of the bottom layer are placed in the four spaces formed by two diagonal lines D1, D2, and the five coils of the top layer are placed on the two diagonal lines D1, D2, as shown in FIG. 2B, such that three coils are passed by in each horizontal direction or vertical direction 1, 2, 3 or each diagonal line D1, D2.

Figure 3A:
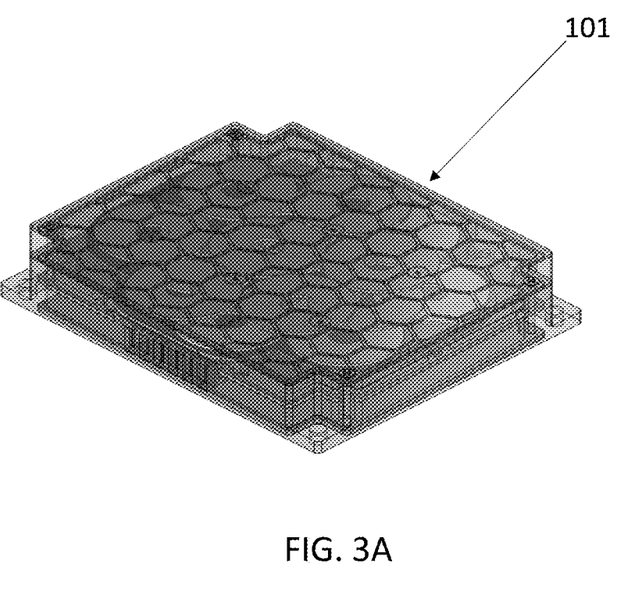
FIG. 3A is a prospective view of a wireless charger in accordance with one embodiment of the invention.
Figure 3B:
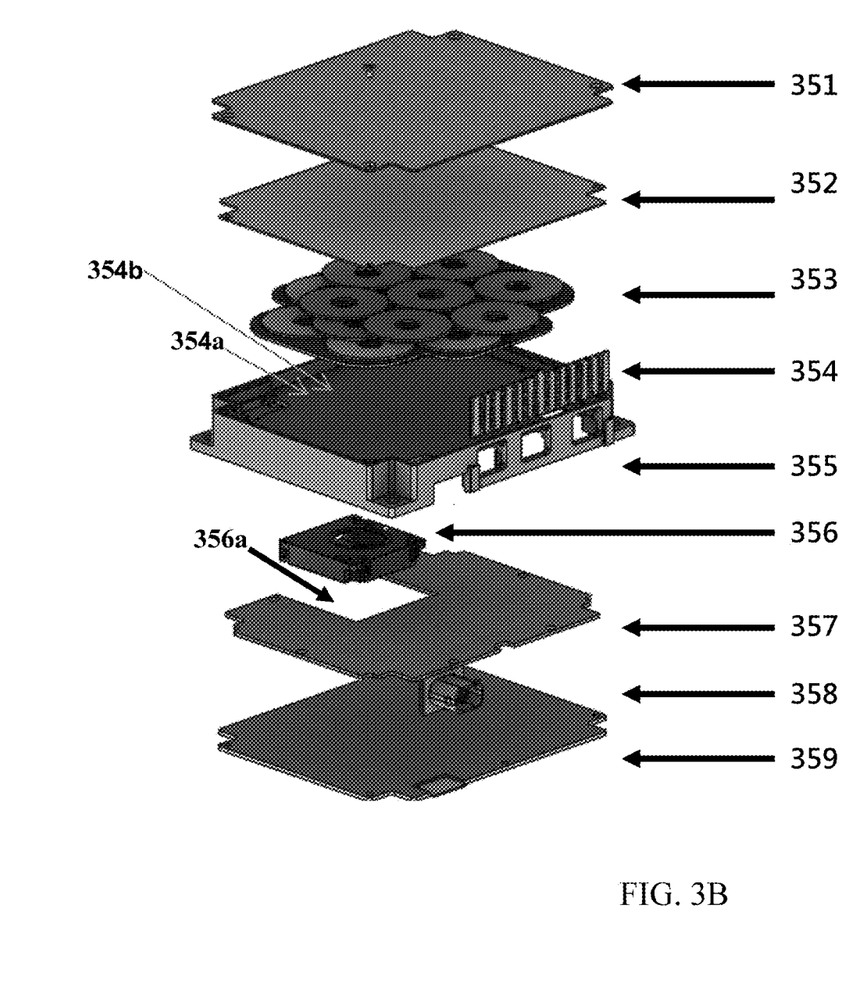
FIG. 3B is an exploded view from the top of a wireless charger in accordance with one embodiment of the invention.
Figure 3C:
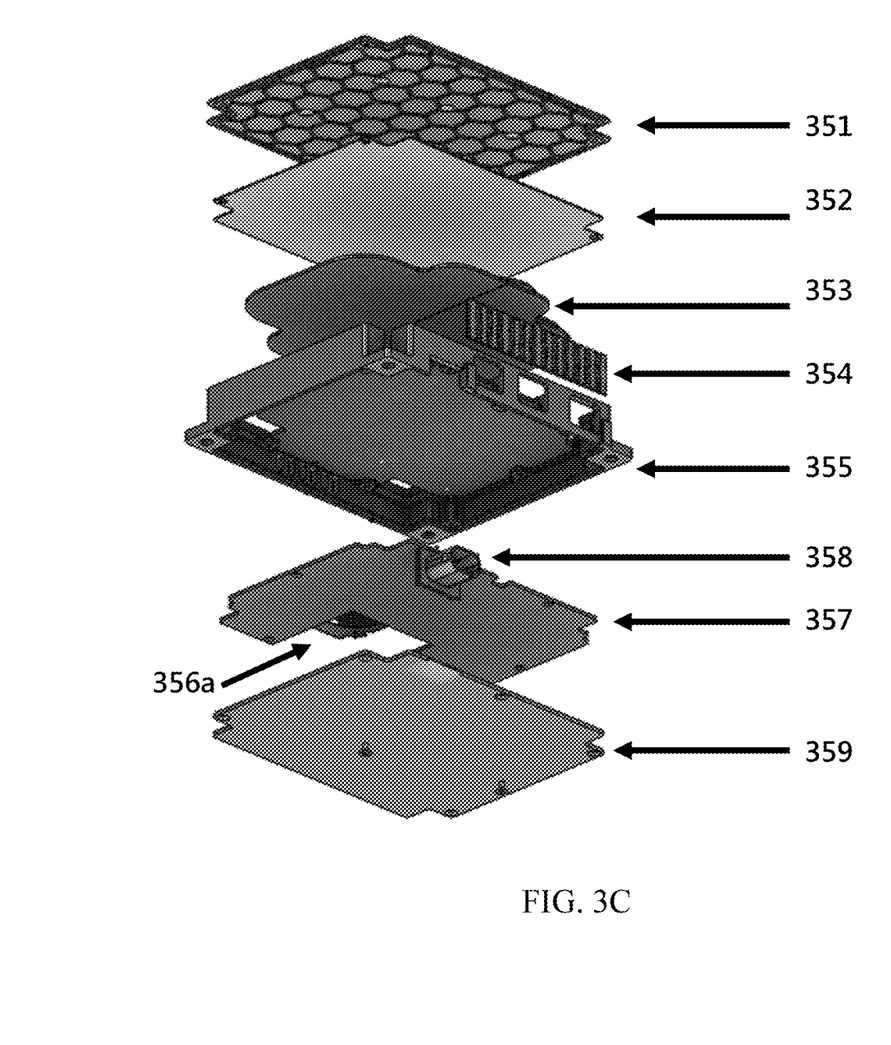
FIG. 3C is an exploded view from the bottom of a wireless charger in accordance with one embodiment of the invention.

FIG. 3A is a prospective view of the wireless charger 101, FIG. 3B an exploded view from the top side of the wireless charger 101 and FIG. 3C is an exploded view from the bottom side of the wireless charger 101 in accordance with one embodiment of the invention.

Please refer to FIG. 3A-3C, wherein the wireless charger 101 comprises: a metallic housing unit 354, comprising a metallic plate 354a, a first recess 354b is formed on a top side of the metallic housing unit 354 and a second recess 354c is formed on a bottom side of the metallic housing unit 354, wherein the first recess 354b and the second recess 354c are on two opposite sides of the metallic plate 354a; at least one conductive element, such as coils 353, disposed in the first recess 354b; and a circuit board 357 disposed in the second recess 354c and electrically conned to at least one conductive element, such as coils 353.

In one embodiment, the at least one conductive element comprises a plurality of coils 353, wherein the plurality of coils 353 are stacked into a plurality of layers for charging at least one electronic device, and the plurality of coils are disposed in the first recess 354b.

In one embodiment, the circuit board 357 has a through-opening 356a, wherein at least one part of the fan 356 is disposed in the through-opening 356a.

In one embodiment, the fan 356 is located at a corner of the metallic housing unit 354, wherein the fan 356 causes the airflow from a first side 354d of the metallic housing unit 354 into a second side 354e of the metallic housing unit 354, wherein the first side 354d and the second side 354e are two adjacent sides of the metallic housing unit 354.

Figure 3D:
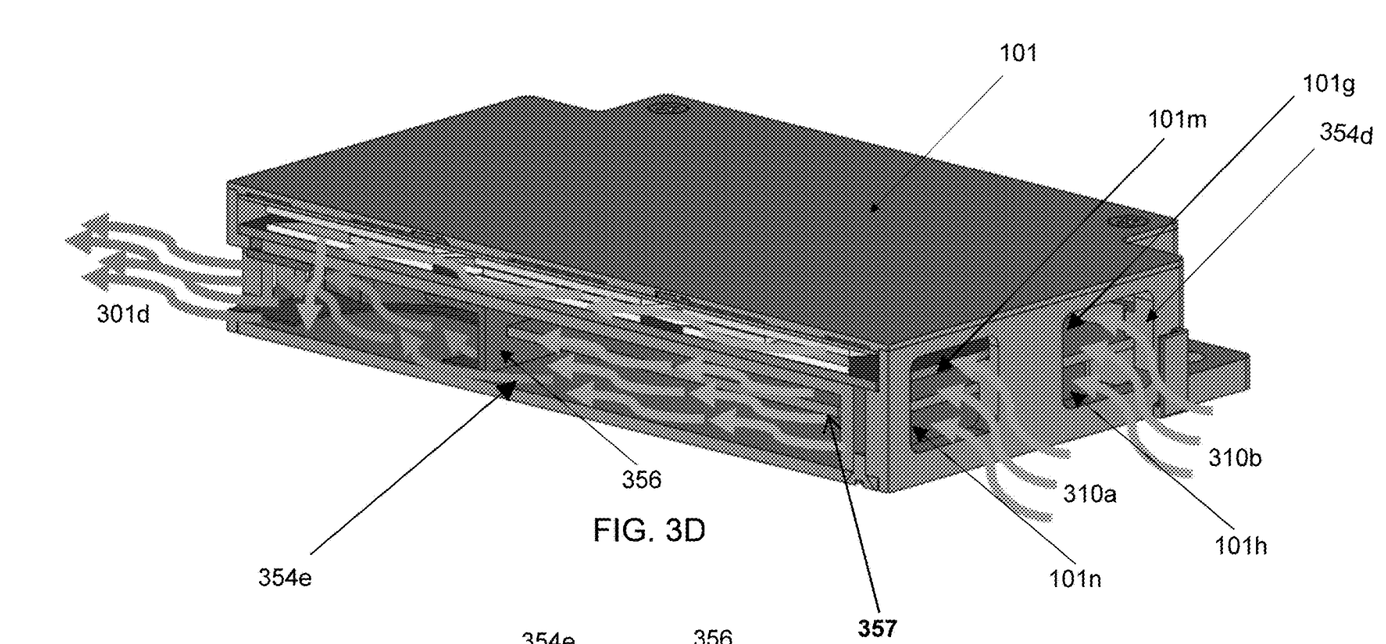
FIG. 3D shows the airflows in the wireless charger caused by a fan in accordance with one embodiment of the invention.

Please refer to FIG. 3D, wherein at least one part of the fan 356 is disposed below the circuit board 357, wherein the fan 356 causes the airflows 310a, 310b into the openings 310g, 310h, 310m, 310n at a first side 354d of the wireless charger 101 into a second side 354e of the wireless charger 101, wherein the first side 354d and the second side 354e are two adjacent sides of the wireless charger 101, wherein the openings 310g, 310m can form airflow paths above the circuit board 357 and the openings 310h, 310n can form airflow paths below the circuit board 357.

Figure 3E:
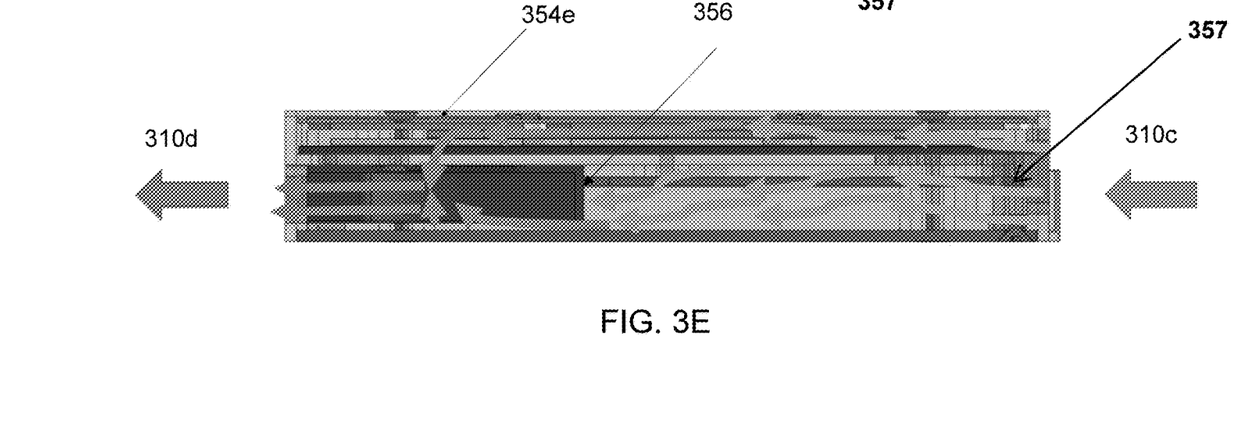
FIG. 3E shows the airflows at a side surface of the wireless charger in accordance with one embodiment of the invention.

Please refer to FIG. 3E, which shows the side view of the airflow at the second side 354e. The fan 356 causes the airflow 301c enter into the second side 354e and the airflow 301d leaves the second side 354e. By doing do, the heat generated by the wireless charger 101 can be dissipated in multiple paths, one path is above the circuit board 357 and another path is below the circuit board 357, so as to lower the temperature of the wireless charger 101 more effectively.

In one embodiment, at least one heat sink extends along the metallic housing unit 354 in a direction of the airflow.

In one embodiment, an EMI filter 352 is disposed over the plurality of coils 353.

In one embodiment, an upper cover 351, which can be a plastic cover, is disposed over the EMI filter 352.

In one embodiment, a lower cover 358, which can be a metal cover, is disposed over the bottom surface of the circuit board 357, wherein the upper cover 351 and the lower cover 358 are at two opposite sides of the metallic plate 354a.

In one embodiment, the plurality of coils 353 are stacked into a plurality of layers with each layer comprising at least two coils, wherein at least two electronic devices are capable of being placed over the plurality of coils in at least two different orientations for charging the at least two electronic devices.

In one embodiment, the plurality of coils 353 comprises eighteen coils stacked into three layers, wherein a bottom layer comprises seven coils, a middle layer comprises four coils, and a top layer comprises seven coils.

In one embodiment, the metallic plate 354a comprises ADC12, that is, the metallic plate 354a can have a strong mechanical strength to withstand the stress when the wireless charger 101 is under pressure, wherein the ADC12 comprises Al—Si—Cu alloy.

In one embodiment, the metallic housing unit 354 comprising aluminum or aluminum alloy material.

In one embodiment, a plurality of fins are located at the inner or outer surface of the metallic housing unit 354, and the plurality of fins extending along the metallic housing unit 354 in a direction of the airflow caused by the fan 356.

In one embodiment, the surface of the plurality of fins may be roughened.

In one embodiment, the air inlet is substantially parallel to the air outlet, and the wireless charger may be configured with a filter for filtering the air form the air inlet. In one embodiment, the filter can be made of a hydrophobic material.

In one embodiment, the wireless charger 101 further includes a fan speed control, which can adjust the fan rotation based on the temperature of the wireless charger 101 or the electronic devices 200, 201.

In one embodiment, a magnetic material is used to encapsulate the coils, wherein the magnetic material can be metal or alloy magnetic material or ferrite magnetic material. The ferrite magnetic material can be polycrystalline, single crystal or amorphous.

In one embodiment, the surface of the metallic housing unit 354 is sealed with the coils 353 by the ferrite magnetic material.

In one embodiment, the metallic housing unit 354 is sealed with the upper cover 351 and the lower cover 358 by the ferrite magnetic material.

In one embodiment, each of the bottom surface of the upper cover 351 and the coils 353 can be in contact with the ferrite magnetic material for transferring the stress, wherein the upper cover 351, the coils 353, and the ferrite magnetic material are supported by the metallic plate 354a of the metallic housing unit 354.

From the foregoing, it will be appreciated that, although specific embodiments have been described herein for purposes of illustration, various modifications can be made without deviating from the spirit and scope of the disclosure. Furthermore, where an alternative is disclosed for a particular embodiment, this alternative may also apply to other embodiments even if not specifically stated.

What is claimed is:

1. A wireless charger, comprising a metallic case, a structure of coils disposed in the metallic case, and an upper cover located above the structure of coils, wherein said structure of coils comprises a plurality of coils, wherein the plurality of coils are stacked into a plurality of layers with each layer comprising at least two coils, wherein at least two electronic devices are capable of being placed over the plurality of coils for charging the at least two electronic devices, wherein the plurality of coils are encapsulated by a ferrite magnetic material with each of a bottom surface of the upper cover and a top surface of the plurality of coils being in contact with the ferrite magnetic material, wherein said upper cover, the plurality of coils and said ferrite magnetic material are supported by a metallic plate of the metallic case with said metallic plate comprising Al—Si—Cu alloy.

2. The wireless charger of claim 1, wherein said two electronic devices are placed over the plurality of coils in a horizontal direction for charging the at least two electronic devices.

3. The wireless charger of claim 1, wherein said two electronic devices are placed over the plurality of coils in a vertical direction for charging the at least two electronic devices.

4. The wireless charger of claim 1, wherein the plurality of coils are stacked into three layers for charging the at least two electronic devices.

5. The wireless charger of claim 1, wherein the plurality of coils are stacked into three layers with each layer comprising at least two coils for charging the at least two electronic devices.

6. The wireless charger of claim 1, wherein the plurality of coils comprises eighteen coils stacked into three layers, wherein a bottom layer comprises seven coils, a middle layer comprises four coils, and a top layer comprises seven coils.

7. The wireless charger of claim 1, wherein the plurality of coils care stacked into two layers, wherein a bottom layer comprises four coils and a top layer comprises five coils.

8. The wireless charger of claim 1, wherein each of said two electronic devices is a mobile phone.

9. A wireless charger, comprising a metallic case, a structure of coils disposed in the metallic case, and an upper cover located above the structure of coils, wherein said structure of coils comprises a plurality of coils, wherein the plurality of coils are stacked into a plurality of layers with each layer comprising at least two coils, wherein an electronic device is capable of being placed over the plurality of coils in at least three different orientations for charging the electronic device, wherein the plurality of coils are encapsulated by a ferrite magnetic material with each of a bottom surface of the upper cover and a top surface of the plurality of coils being in contact with the ferrite magnetic material, wherein said upper cover, the plurality of coils and said ferrite magnetic material are supported by a metallic plate of the metallic case with said metallic plate comprising Al—Si—Cu alloy.

10. The wireless charger of claim 9, wherein said electronic device is capable of being placed over the plurality of coils in a horizontal, a vertical or a diagonal direction for charging said electronic device.

11. The wireless charger of claim 9, wherein said electronic device is a mobile phone.

12. A wireless charger, comprising:
a metallic housing unit, comprising a metallic plate, wherein a first recess is formed on a top side of the metallic housing unit and a second recess is formed on a bottom side of the metallic housing unit, wherein the first recess and the second recess are on two opposite sides of the metallic plate;
a plurality of coils, disposed in the first recess;
an upper cover, located above the plurality of coils; and
a circuit board, disposed in the second recess and electrically connected to the plurality of coils, wherein the plurality of coils are encapsulated by a ferrite magnetic material with each of a bottom surface of the upper cover and a top surface of the plurality of coils being in contact with the ferrite magnetic material, wherein said upper cover, the plurality of coils and said ferrite magnetic material are supported by said metallic plate comprising Al—Si—Cu alloy.

13. The wireless charger of claim 12, wherein the plurality of coils are stacked into a plurality of layers for charging at least one electronic device.

14. The wireless charger of claim 12, wherein the circuit board has a through-opening, wherein a first part of a fan is disposed in the through-opening and a second part of the fan is disposed below the circuit board.

* * * * *